June 17, 1947.  F. J. SIGMUND ET AL  2,422,591
MAGNETIZABLE CORE
Filed April 12, 1943
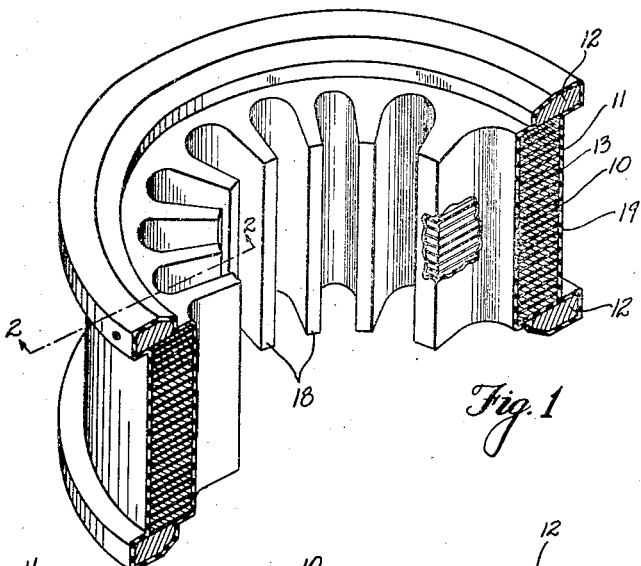
Fig. 1
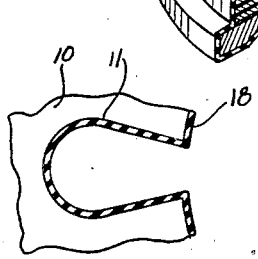
Fig. 3  Fig. 4
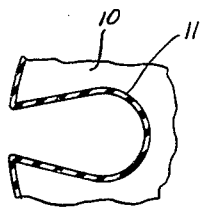
Fig. 2
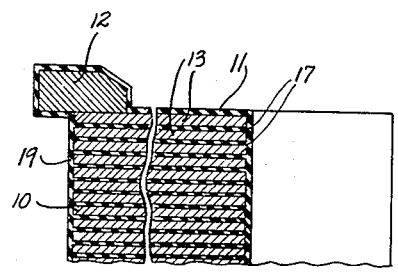
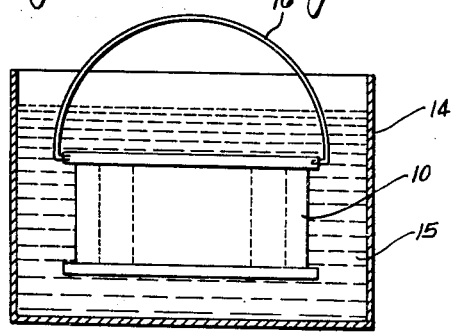
Fig. 5  Fig. 6
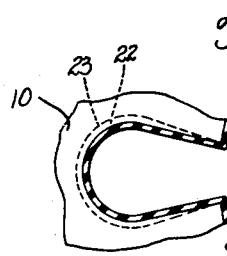
Fig. 8
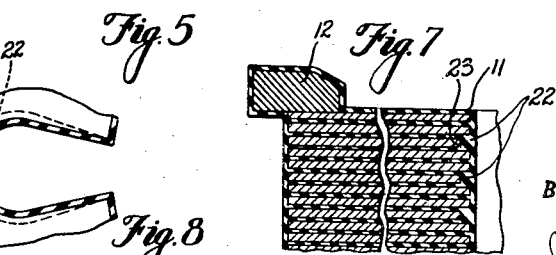
Fig. 7
INVENTOR.
Frank J. Sigmund
BY William S. Hlavin
Woodling and Krost
attys Patented June 17, 1947

2,422,591

UNITED STATES PATENT OFFICE 2,422,591

MAGNETIZABLE CORE

Frank J. Sigmund and William S. Hlavin, Cleveland, Ohio, assignors, by mesne assignments, to Sigmund Corporation, a corporation of Ohio Application April 12, 1943, Serial No. 482,710

3 Claims. (Cl. 171—252)

Our invention relates in general to magnetizable cores and more particularly to magnetizable cores for dynamo-electric machines having slots adapted to receive coil windings.

A great deal of difficulty has been experienced in mounting the windings in the coil slots of dynamo-electric machines so that the windings would be insulation-proof against high voltage and at the same time be protected from moisture, dust, vibration and abrasive wear. In the prior art the sharp edges of the laminations which comprise the core would cut the paper insulation sheets in the slots as well as the insulation on the conductors themselves. This skinning or cutting of the insulation was particularly true where the motor was operated at high speed and had excessive vibration. Observations show that the paper, cambric, or fibrous material which is used as the slot insulation sleeves contain many impurities and in addition readily absorb water. It appears that the presence of the paper or other fibrous insulating sheets in the slots in combination with the small cracks or crevices between the laminations function to produce a "wick" action, in that a capillary action is set up which tends to draw moisture through the small cracks between the stacked laminations to the paper or other insulation sheets. This action is continuously present, so that over a long period, the paper or other fibrous insulation in the slots becomes deteriorated. Test observations show that the resistance to ground varies quickly with changes in moisture conditions surrounding the dynamo-electric machine. Thus the resistance to ground changes fairly quickly with corresponding changes in weather conditions, especially when the motor is remaining idle for a relatively long period of time. Further observations reveal that cracks and distortion occur quickly when the lamination cores are subjected to large temperature differences ranging from substantially 50 to 70 degrees below zero to high room temperature conditions.

Paper and other insulation sheets, for instance fiber, even when they are as dry as they can practicably be, are none too good as an insulator because they may then contain as much as 5 to 10 per cent moisture. When they absorb an additional amount of moisture resulting from damp conditions, the insulating properties materially decrease. Furthermore, the paper swells and causes defects to appear. These disadvantages have been known for many years but have not been successfully overcome.

Another objection to paper or other material insulation sheets in the slots is that when the windings are placed in the slots, there exist air pockets or air spaces between the windings and the sheets and between the sheets and the core. Moreover, the sheets of insulation are relatively stiff and the windings may likewise be relatively stiff with the result that there is not perfect meeting or contact between the windings and the insulation sheets which decreases the heat conductivity and accordingly lowers the heat dissipation from the windings over to the magnetizable core. The presence of the air spaces between the windings and the insulation sheets and between the sheets and the core sets up a condition where oxidation may readily occur, which over a long period of operation may destroy the insulation about the windings. In the case of high voltage windings, the presence of said air pockets or spaces lead to further complications in that the slot walls are over-stressed so that they glow. Active electrical discharges occur.

An object of our invention is to obviate all of the hereinbefore mentioned defects.

A more specific object of our invention is to provide for eliminating capillary action between the laminations of the stator core.

Another object of our invention is to cover or coat the surface of the slots of the core with a rubber-like material to eliminate air pockets.

Another object of our invention is to provide for sealing the laminations together with respect to each other by means of rubber-like material to seal the spaces between the laminations against capillary action, and for applying a coating of the rubber-like material upon the surface of the slots in which the coating of the rubber-like material in the slots is anchored to the rubber-like material between the laminations.

Another object of our invention is to coat the entire magnetizable core with a rubber-like material.

Another object of our invention is to dispense with the requirement of using slot sleeves which may be made of paper, fiber, or other insulation sheets.

Another object of our invention is to prevent the corners of the laminations from cutting or otherwise damaging the insulation about the wires.

Another object of our invention is the provision of a covering in the slots and about the laminations to absorb vibration shocks which would otherwise be imparted to the windings.

Another object of our invention is the provision of a coating or covering in the slots into which the wires may be somewhat embedded so that there is substantially no air spaces between the windings and the magnetizable core, with the result that the heat dissipation and the dielectric strength are maintained as high as possible.

Another object of our invention is to first apply a rubber-like under coating which may contain powdered mica, asbestos, or other suitable insulating material and then to apply an outside coating of substantially pure rubber-like material, the under coating providing a good mechanically strong structure as well as one which is resistant to high temperatures and has good electrical insulating properties, and the outside coating forming a good watertight seal to prevent any moisture from being absorbed by the powdered mica, asbestos, or similar material.

Another object of our invention is to provide for increasing the heat dissipation area of the rubber-like coating the core slots as well as increasing the strength of the rubber deposit.

Other objects and a fuller understanding of our invention may be had by referring to the following description and claims taken in conjunction with the drawings in which:

Figure 1 shows a cross-sectional view of a stator embodying the features of our invention;

Figure 2 is an enlarged fragmentary view of a cross-section of the laminated core taken along the line 2—2 of Figure 1 and shows particularly the deposition of the rubber-like material between the laminations;

Figure 3 shows an enlarged fragmentary cross-sectional view of a slot of the stator;

Figure 4 is a view similar to Figure 3 but shows a cross-sectional view of a slot in a rotor containing the provisions of our invention;

Figure 5 shows a container having the rubber-like substance therein which may be employed when dipping is used as a method of applying the rubber-like coat to the magnetizable core;

Figure 6 is a view similar to Figure 3 but shows an inner or under layer coating which may comprise powdered mica, asbestos, or other similar material and an outer layer which may comprise pure rubber-like material;

Figure 7 is a view similar to Figure 2 but shows certain of the laminations in the region adjacent the slots being enlarged which provide radially and outwardly disposed ribs on the coating in the sleeve to increase the radiation area and to increase the strength of the rubber sleeve deposit; and, Figure 8 is a view similar to Figure 3 but shows the enlarged slots of Figure 7.

With reference to Figure 1 of the drawings, the core 10 may comprise a stack of laminations and end rings 12 suitably held together in any well known manner. As illustrated, the entire surface of the magnetizable core 10 and the rings 12 are covered with a rubber-like material 11. In our invention, the rubber-like materials include a variety of substances in which the predominate part may comprise polymers of vinyl compounds, such as vinyl chloride, vinyl acetate, vinyl acetals and alcohols, and vinylidene chloride. It may further include mixtures and copolymers of the vinyl compounds.

We find that the compounds identified above give very good results, however, we do not want to be specifically confined to these compounds as our invention contemplates the use of any rubber-like material or synthetic rubber to produce the insulation with the necessary properties required for the service conditions. It is within the scope of our invention to choose the best rubber-like compound with distinctive qualities which make that compound the most suitable for the insulation such as: (1) low water absorption, (2) high electrical resistance, (3) great resistance to chemicals, including acids, alkalies, corrosives and gases, (4) good tensile strength, (5) easy to apply to the magnetizable core.

The softening point of the rubber-like material should be as high as possible, thus permitting the temperature of the motor to rise to a high value. The rubber-like plastics or their compounds have a wide range of temperature resistance and point of softening. Some begin to soften at 140° F., others at 200° F. or more. Other grades can be employed with a softening temperature higher than 200° F. and do not become brittle at sub-zero temperatures and which have high dielectric and high tensile strengths.

As shown in Figure 2, the rubber-like material 11, is applied between the laminations 13. In practice every other one of the laminations may be dipped in a rubber-like material so that when they are all stacked, the rubber-like material appears between each lamination. As an alternative the sheets may be sprayed. The stacked core may be pressed together very tightly to squeeze out any excess rubber-like material, with the result that a very thin layer of rubber-like material is present between the laminations. The stacked core may be heated to set the rubber-like material between the laminations. The heating may be done either by electrical induction or by placing the stacked laminations in a suitable drying oven or the like. After the rubber-like material between the laminations is set or dry, the next operation is to apply the rubber-like coating 11 to the outside of the core. In practice we find that this may be done by dipping the entire magnetizable core 10 into a container 14 having a supply of rubber-like material 15. As illustrated in Figure 5, a bale 16 or other handle may be connected to the magnetizable core to facilitate the dipping. The outside coating also may be applied by spraying or brushing.

The thickness of the rubber-like coating 11 depends upon the purpose for which the dynamomachine is to be used. If the machine is to be merely exposed to dust, atmospheric moisture or chemically corrosive fumes, the thickness of the coating need not be greater than the commonly used fish paper slot sleeves, namely about $\frac{1}{20}$ to $\frac{1}{30}$ of an inch thick. The thickness may be greater if complete waterproofing is desired. In that case, the thickness may be as much as from $\frac{1}{16}$ to $\frac{1}{10}$ of an inch. To obtain a thickness of $\frac{1}{10}$ of an inch it may require as many as five or six dippings. For best practice, the coating may be permitted to dry in air for about thirty minutes between each dipping and then after all of the dippings are made the complete stator with the coating thereabout may be dried by any suitable heating method, such for example as by heating oven or the like. After the material is baked the core is then ready for the insertion of the windings in the coated slots. The coating of the rubber-like material 11 forms a watertight coating and is somewhat flexible and will not crack or break incident to contractions and expansions of the laminations. The coating may also be exposed to a wide range of temperatures without cracking or permitting the moisture to pass therethrough. The coating may withstand temperatures as low as substantially 50 to 70 degrees below zero and up to softening points.

The coating is somewhat elastic and shock absorbent in that the windings are protected against vibration. Moreover, the coating is slightly deformable so that as the windings are locked in position in the slots, the windings merely become slightly embedded in the coating so that there is a good contact between the windings and the coating which increases the dissipation of heat and the dielectric strength. The fact that the windings make a good contact with the covering in the slots also provides an arrangement which reduces the tendency of the windings to vibrate as would be the case if a good firm contact were not made.

The rubber-like coating 11 also protects the windings where they overlap the edge on the ends of the slots. The layers of rubber-like material between the laminations prevent capillary attraction of the moisture and keep the slot perfectly dry. In addition, the rubber-like material between the laminations provides anchoring points as indicated by the reference character 17, so that the coating within the slots are firmly anchored at these anchoring points to prevent any separation between the coating in the slots and the laminations.

The layers of rubber-like material between the laminations also reduce the effect of eddy currents. When the laminations are punched, there often results a burr on the sheared edge which may vary in thickness from .001 of an inch to .007 of an inch and upon pressing the laminations together, the burrs tend to hold the laminations apart so that there is a tendency for the laminations not to lay perfectly flat upon each other. The spaces between the laminations resulting from the presence of these burrs creates additional capillary interstices which form a perfect path for moisture to enter between the laminations. With our coating this capillary action is completely blocked off.

For efficient operation the coating which extends around the teeth 18 between the slots is preferably made thinner than the coating within the slots. The object of making the coating thin on the surface which extends around the teeth is not to increase the air gap. We find that the coating which extends around the teeth 18 may be made thinner by machining the inside of the stator by a suitable tool. In the machining operation, the coating which extends around the teeth 18 may be left very thin to minimize the air gap. The coating which extends around the teeth 18 should remain thick enough to prevent moisture from entering between the laminations. Another method of reducing the thickness of the coating which extends around the teeth 18 would be to insert a mandrel which fits snugly within the stator to prevent any coating from being deposited upon the teeth 18 during the first few dippings, after which, the mandrel may be removed, thus permitting the coating to be applied to the teeth 18 during the last few dippings only.

The thickness of the coating which covers the outside surface 19 of the core may also be made thin to enable the core to dissipate heat readily. The coating around the outside surface 19 may be made thin by machining or by employing wrapping or masking tape during the first several dippings after which the masking tape may be removed together with subsequent dippings before baking the assembly in the oven.

In Figure 6 we show an inside or inner layer of rubber-like material 20 and an outside layer of rubber-like material 21. The inside layer 20 may be provided with powdered mica, asbestos, or other suitable material so that the layer provides a good surface for heat transfer as well as one possessing a high electrical resistance to ground. The outside layer 21 may comprise a pure rubber-like substance to give a perfectly watertight seal which prevents water from gaining access to the inside coating 20.

In Figures 7 and 8 we show an arrangement for providing ribs 22 which extend radially outwardly from the coating within the slots to increase the radiation surface of the rubber-like material. The ribs also give additional anchorage to make the coating within the slots stronger. The ribs 22 may be easily provided by making certain space laminations with an enlarged slot 23 so that when the laminations are stacked, radial spaces are provided for the rubber-like material to be deposited in making the ribs.

The danger of the presence of a thin air layer in a surface between a laminated core and the insulating material is completely obviated as the last trace of the air is removed as the seal between the rubber-like material and the lamination is perfect. The bond between the coating and the laminations is not disposed to crack, with the result that substantially all of the defects present in the prior art devices have been overcome. The coating is substantially uniform and homogeneous throughout, and thus there are no hot spots or spheres resulting from different materials as used in the prior art cores to cause break downs of the insulation.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In the dynamo-electric machine, a magnetizable core with a plurality of slots, said core having a skin coating of fluid-tight insulating material, same material covering the surface of the slots with a skin coating and forming fluid-tight insulating sleeves, said coating comprising an inner layer and an outer layer, said inner layer having a filler of high heat resistance material to improve the mechanical properties of the coating, and said outer layer comprising substantially the pure fluid-tight insulating material.

2. In the dynamo-electric machine, a magnetizable core with a plurality of slots, said core having a skin coating of fluid-tight insulating material, same material covering the surface of the slots with a skin coating and forming fluid-tight insulating sleeves, said coating comprising an inner layer and an outer layer, said inner layer having a filler including mica to improve the electrical and mechanical properties of the coating, and said outer layer comprising substantially the pure fluid-tight insulating material.

3. In the dynamo-electric machine, a magnetizable core with a plurality of slots, said core having a skin coating of fluid-tight insulating material, same material covering the surface of the slots with a skin coating and forming fluid-tight insulating sleeves, said coating comprising an inner layer and an outer layer, said inner layer having a filler including asbestos to improve the electrical and mechanical properties of the coating, and said outer layer comprising substantially the pure fluid-tight insulating material.

FRANK J. SIGMUND.
WILLIAM S. HLAVIN.

REFERENCES CITED

The following references are of record in the file of this patent:

UNITED STATES PATENTS

| Number | Name | Date |
|---|---|---|
| 1,875,207 | Apple | Aug. 30, 1932 |
| 2,128,544 | Sujaninoff | Aug. 30, 1938 |
| 2,124,610 | Dolgoff | July 26, 1938 |
| 422,550 | Thomson | Mar. 4, 1890 |
| 1,315,936 | Apple | Sept. 16, 1919 |
| 1,974,406 | Apple | Sept. 25, 1934 |
| 2,169,097 | Hall | Aug. 8, 1939 |
| 2,320,866 | Hill | June 1, 1943 |
| 464,026 | Kammeyer | Dec. 1, 1891 |
| 1,678,380 | Cooper | July 24, 1928 |

FOREIGN PATENTS

| Number | Country | Date |
|---|---|---|
| 451,776 | Great Britain | Aug. 11, 1936 |

OTHER REFERENCES

The Dynamo, vol. 1, by C. C. Hawkins, 6th edition, published by Sir Isaac Pitman & Sons, 1922, pages 327 and 328, copy in Div. 26.